(12) United States Patent
Rahman et al.

(10) Patent No.: US 10,998,749 B2
(45) Date of Patent: May 4, 2021

(54) ELECTRONIC APPARATUS AND METHOD FOR CONTROLLING THEREOF

(71) Applicant: Samsung Electronics Co., Ltd., Suwon-si (KR)

(72) Inventors: Muhammad Mahbubur Rahman, Dacca (BD); Mohammad Anwarul Hoque, Dacca (BD); S. M. Rezaul Haque, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 16/272,512

(22) Filed: Feb. 11, 2019

(65) Prior Publication Data
US 2019/0252899 A1  Aug. 15, 2019

(30) Foreign Application Priority Data
Feb. 14, 2018 (KR) .................. 10-2018-0018800

(51) Int. Cl.
*H02J 50/80* (2016.01)
*H02J 7/02* (2016.01)
*H02J 50/23* (2016.01)
*H02J 50/60* (2016.01)

(52) U.S. Cl.
CPC .............. *H02J 7/02* (2013.01); *H02J 7/025* (2013.01); *H02J 50/23* (2016.02); *H02J 50/60* (2016.02); *H02J 50/80* (2016.02)

(58) Field of Classification Search
CPC ...................................... H02J 7/025
USPC ....................................... 320/108
See application file for complete search history.

(56) References Cited

U.S. PATENT DOCUMENTS

| | | | |
|---|---|---|---|
| 8,447,234 B2 | 5/2013 | Cook et al. | |
| 9,106,106 B2 * | 8/2015 | Liu ................ | H02J 50/80 |
| 2007/0109121 A1 | 5/2007 | Cohen | |
| 2008/0265835 A1 | 10/2008 | Reed et al. | |
| 2010/0079012 A1 * | 4/2010 | Hyde .............. | H02J 50/15 |
| | | | 307/149 |
| 2010/0164433 A1 | 7/2010 | Janefalkar et al. | |

(Continued)

FOREIGN PATENT DOCUMENTS

| | | |
|---|---|---|
| EP | 3 190 686 A1 | 7/2017 |
| KR | 10-2009-0027312 A | 3/2009 |
| KR | 10-1392866 B1 | 5/2014 |

OTHER PUBLICATIONS

European Search Report dated Apr. 21, 2020, issued in European Application No. 19754571.8.

(Continued)

*Primary Examiner* — Edward Tso
*Assistant Examiner* — Ahmed H Omar
(74) *Attorney, Agent, or Firm* — Jefferson IP Law, LLP

(57) ABSTRACT

An electronic apparatus is provided. The electronic apparatus includes a directional antenna, and at least one processor configured to, based on a signal to request charging of a battery of an external apparatus being received from the external apparatus through the directional antenna, identify a location of the external apparatus based on intensity of the signal and a direction in which the signal is received, and control the directional antenna to transmit a radio frequency (RF) signal to charge battery of the external apparatus toward the external apparatus.

17 Claims, 11 Drawing Sheets

(56) References Cited

U.S. PATENT DOCUMENTS

| | | |
|---|---|---|
| 2012/0155220 A1 | 6/2012 | Lee et al. |
| 2012/0303980 A1 | 11/2012 | Culbert et al. |
| 2013/0241308 A1 | 9/2013 | Bilbrey et al. |
| 2014/0002013 A1 | 1/2014 | Kossi et al. |
| 2014/0128107 A1 | 5/2014 | An |
| 2015/0102680 A1 | 4/2015 | Menegoli |
| 2016/0087337 A1 | 3/2016 | Khlat |
| 2016/0087486 A1* | 3/2016 | Pogorelik ............... H02J 7/042 320/108 |
| 2016/0149437 A1 | 5/2016 | Leabman et al. |
| 2016/0181854 A1* | 6/2016 | Leabman ............... H02J 50/60 320/108 |
| 2017/0249546 A1 | 8/2017 | Weisgerber et al. |
| 2017/0294796 A1 | 10/2017 | Nie et al. |
| 2017/0331332 A1 | 11/2017 | Lee et al. |
| 2017/0358950 A1 | 12/2017 | Zeine et al. |

OTHER PUBLICATIONS

International Search Report dated May 20, 2019, issued in the International Application No. PCT/KR2019/001167.
Moon et al., Ultrasonic Power Transfer for Medical Implants, Jul. 2017.
Examination Report dated Sep. 25, 2020, issued in European Patent Application No. 19754571.8.

\* cited by examiner

ELECTRONIC APPARATUS AND METHOD FOR CONTROLLING THEREOF

CROSS-REFERENCE TO RELATED APPLICATION(S)

This application is based on and claims priority under 35 U.S.C. § 119(a) of a Korean patent application number 10-2018-0018800, filed on Feb. 14, 2018, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus capable of charging battery of an external apparatus and a method for controlling thereof.

2. Description of Related Art

With recent development of electronic technology, various electronic apparatuses, such as a smartphone, a smart watch, a Bluetooth earphone, or the like have been developed.

In order to use such electronic apparatuses, it is necessary to charge the battery inside the electronic apparatus. Generally, the charging of the battery is performed by using a cable and connecting the electronic apparatus to the power source. However, in the case of charging using a cable, there is an issue that there is a spatial limitation for the use of the electronic apparatus while charging.

In order to address such an issue, various wireless charging methods have been developed in recent years. For example, there have been developed an electromagnetic induction method in which a coil in a wireless charging apparatus and a coil in an electronic apparatus, such as a smart phone cause an induction current to charge battery, and a magnetic resonance method which generates a magnetic field in a coil inside the wireless charging apparatus, and transfers electric energy to the coil of an electronic apparatus, such as a smartphone.

However, the aforementioned method has an issue in that an electronic apparatus, such as a smartphone must be located to be close to a wireless charging apparatus. For example, since the charging is performed only at a close distance, there is an issue that space is limited in the same manner as charging using a cable.

In addition, in case of the system of the related art, battery of only one electronic apparatus can be charged using one wireless charging apparatus, and each battery of a plurality of electronic apparatuses cannot be simultaneously charged through one wireless charging apparatus.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus capable of charging batteries of a plurality of electronic apparatuses through a wireless charging apparatus and a method for controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a directional antenna, and a processor configured to, based on a signal to request charging of a battery of an external apparatus being received from the external apparatus through the directional antenna, identify a location of the external apparatus based on intensity of the signal and a direction in which the signal is received, and control the directional antenna to transmit a radio frequency (RF) signal to charge battery of the external apparatus toward the external apparatus.

The processor may, based on signals to request charging of batteries of a first external apparatus and a second external apparatus being received from the first external apparatus and the second external apparatus respectively, transmit an RF signal to charge a battery of the first external apparatus to the first external apparatus and an RF signal to charge a battery of the second external apparatus to the second external apparatus sequentially according to a priority.

The processor may, based on signals to request charging of batteries of the first external apparatus and the second external apparatus being received from the first external apparatus and the second external apparatus respectively, identify intensities of RF signal to be transmitted to each of the first external apparatus and the second external apparatus according to a priority, and transmit an RF signal to charge a battery of the first external apparatus and a battery of the second external apparatus respectively based on the intensities of the RF signal to the first external apparatus and the second external apparatus.

The processor may, based on the external apparatus being identified to be positioned at a location that is farther than a preset distance from the electronic apparatus based on a location of the external apparatus, provide guide information to request to move the external apparatus to be a location that is closer than the preset distance.

The electronic apparatus may further include a sensor, wherein the processor may, based on an electric field corresponding to a human body being detected by the sensor in a direction where the external apparatus is located, adjust intensity of the RF signal that is transmitted to the external apparatus to be less than or equal to a preset threshold value.

The processor may transmit, to a user terminal apparatus, information on charging intensity of the external apparatus corresponding to the intensity of the RF signal and information on remaining capacity of the battery received from the external apparatus.

The processor may, based on information to inform that charging of the battery is completed being received from the external apparatus, stop transmitting the RF signal.

The processor may, based on a signal to request charging of the battery being received from the external apparatus, transmit, to the external apparatus, an authentication request signal to confirm whether the external apparatus is an authenticated apparatus based on a location of the external apparatus, and based on authentication information being received from the external apparatus, to respond to transmission of the authentication request signal, identify whether the external apparatus is an authenticated apparatus based on the authentication information and when the external apparatus is an authenticated apparatus, transmit the RF signal to the external apparatus.

In accordance with another aspect of the disclosure, a method for controlling an electronic apparatus is provided. The method includes, based on a signal to request charging of a battery of an external apparatus being received from the external apparatus, identifying a location of the external apparatus based on intensity of the signal and a direction in which the signal is received, and transmitting a RF signal to charge battery of the external apparatus toward the external apparatus based on the location of the external apparatus.

The transmitting an RF signal may include, based on signals to request charging of batteries of a first external apparatus and a second external apparatus being received from the first external apparatus and the second external apparatus respectively, transmitting an RF signal to charge a battery of the first external apparatus to the first external apparatus and a battery of the second external apparatus to the second external apparatus sequentially according to a priority.

The transmitting an RF signal may include, based on signals to request charging of batteries of the first external apparatus and the second external apparatus being received from the first external apparatus and the second external apparatus respectively, identifying intensities of RF signal to be transmitted to each of the first external apparatus and the second external apparatus according to a priority, and transmitting an RF signal to charge a battery of the first external apparatus and a battery of the second external apparatus respectively based on the intensities of the RF signal to the first external apparatus and the second external apparatus.

The method may further include, based on the external apparatus being identified to be positioned at a location that is farther than a preset distance from the electronic apparatus based on a location of the external apparatus, providing guide information to request to move the external apparatus to be a location that is closer than the preset distance.

The transmitting the RF signal may include detecting electric field corresponding to a human body in a direction in which the external apparatus is located, and adjusting intensity of the RF signal that is transmitted to the external apparatus to be less than or equal to a preset threshold value.

The method may further include transmitting, to a user terminal apparatus, information on charging intensity of the external apparatus corresponding to the intensity of the RF signal and information on remaining capacity of the battery received from the external apparatus.

The method may further include, based on information to inform that charging of the battery is completed being received from the external apparatus, stopping the transmitting of the RF signal.

The transmitting the RF signal may include, based on a signal to request charging of the battery being received from the external apparatus, transmitting, to the external apparatus, an authentication request signal to confirm whether the external apparatus is an authenticated apparatus based on a location of the external apparatus, based on authentication information being received from the external apparatus, to respond to transmission of the authentication request signal, identifying whether the external apparatus is an authenticated apparatus, and based on the external apparatus being an authenticated apparatus, transmitting the RF signal to the external apparatus.

In accordance with another aspect of the disclosure, a computer program product is provided. The computer program product comprising one or more computer readable storage media having program therein that include, based on a signal to request charging of a battery of an external apparatus being received from the external apparatus, identifying a location of the external apparatus based on intensity of the signal and a direction in which the signal is received, and transmitting a RF signal to charge battery of the external apparatus toward the external apparatus based on the location of the external apparatus.

The transmitting the RF signal may include, based on signals to request charging of batteries of a first external apparatus and a second external apparatus being received from the first external apparatus and the second external apparatus respectively, transmitting an RF signal to charge a battery of the first external apparatus to the first external apparatus and a battery of the second external apparatus to the second external apparatus sequentially according to a priority.

The transmitting the RF signal may include, based on signals to request charging of batteries of the first external apparatus and the second external apparatus being received from the first external apparatus and the second external apparatus respectively, identifying intensities of RF signal to be transmitted to each of the first external apparatus and the second external apparatus according to a priority, and transmitting RF signal to charge a battery of the first external apparatus and a battery of the second external apparatus respectively based on the intensities of the RF signal to the first external apparatus and the second external apparatus.

The computer readable storage media may further include, based on the external apparatus being identified to be positioned at a location that is farther than a preset distance from the electronic apparatus based on a location of the external apparatus, providing guide information to request to move the external apparatus to be a location that is closer than the preset distance.

The transmitting the RF signal may include detecting electric field corresponding to a human body in a direction in which the external apparatus is located, and adjusting intensity of the RF signal that is transmitted to the external apparatus to be less than or equal to a preset threshold value.

The computer readable storage media may further include, transmitting, to a user terminal apparatus, information on charging intensity of the external apparatus corresponding to the intensity of the RF signal and information on remaining capacity of the battery received from the external apparatus.

The computer readable storage media may further include, based on information to inform that charging of the battery is completed being received from the external apparatus, stopping the transmitting of the RF signal.

The transmitting the RF signal may include, based on a signal to request charging of the battery being received from the external apparatus, transmitting, to the external apparatus, an authentication request signal to confirm whether the external apparatus is an authenticated apparatus based on a location of the external apparatus, based on authentication information being received from the external apparatus, to respond to transmission of the authentication request signal, identifying whether the external apparatus is an authenticated apparatus, and based on the external apparatus being an authenticated apparatus, transmitting the RF signal to the external apparatus.

According to various embodiments of the disclosure, a user may move an external apparatus somewhat freely while the external apparatus is being charged. In addition, by using a directional antenna, a battery of an external apparatus can be charged rapidly and efficiently, and a plurality of external apparatuses can be charged.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the disclosure will be described in greater detail with reference to the attached drawings.

Figure 1:
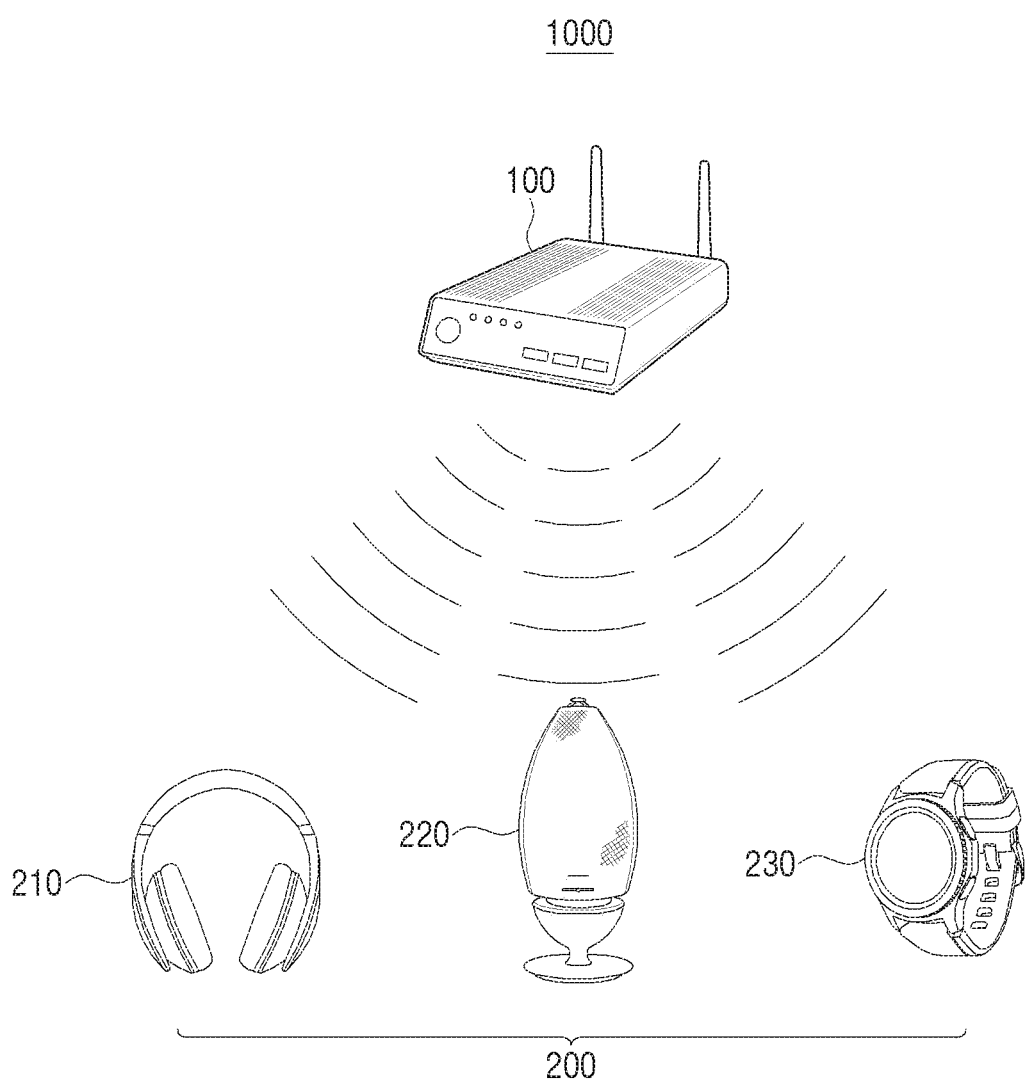
FIG. 1 is a diagram illustrating a wireless charging system according to an embodiment of the disclosure.

FIG. 1 is a diagram illustrating a wireless charging system according to an embodiment of the disclosure.

Referring to FIG. 1, a wireless charging system 1000 according to an embodiment may include an electronic apparatus 100 and at least one external apparatus 200.

The electronic apparatus 100 and the external apparatus 200 may transmit and receive various signals.

To be specific, the external apparatus 200 may transmit, to the electronic apparatus 100, a signal requesting charging of a battery of the external apparatus 200.

For example, the external apparatus 200, when a user command to request charging of a battery is input, or remaining capacity of a battery is less than or equal to a preset capacity, may transmit, to the electronic apparatus 100, a signal to request charging of a battery. Here, the preset capacity may be set in a diverse manner according to a user command. For example, the preset capacity can be 10% of a total capacity of the battery.

The electronic apparatus 100, when a signal to request charging of the battery is received from the external apparatus 200, may transmit, to the external apparatus 200, a signal for charging the battery of the external apparatus 200.

Specifically, when a signal to request charging of the battery is received from the external apparatus 200, the electronic apparatus 100 may transmit a radio frequency (RF) signal for charging the battery of the external apparatus 200 to the external apparatus 200. Here, the RF signal can be generated by supplying power to the resonance coil provided in the electronic apparatus 100.

The external apparatus 200 may convert the RF signal received from the electronic apparatus 100 to direct current (DC) and charge the battery of the external apparatus 200.

As compared with the radio communication apparatus in which the battery of the external apparatus 200 is charged with the RF signal and performs the wireless charging by the electromagnetic induction method of the related art or the magnetic resonance method as described above, the electronic apparatus 100 has an effect to charge the battery of the external apparatus 200 from a remote distance.

While the external apparatus is being charged, a user may move the external apparatus 200 in a comparatively free manner.

The electronic apparatus 100 can transmit an RF signal for charging the battery of the external apparatus 200 toward the external apparatus 200. For example, rather than transmitting the RF signal in an omnidirectional manner, the electronic apparatus 100 may transmit the RF signal toward the external apparatus 200.

Compared to a case in which the RF signal is transmitted in an omnidirectional manner, battery of the external apparatus 200 can be charged rapidly and efficiently.

As illustrated in FIG. 1, the external apparatus 200 may be implemented as an earphone 210, a speaker 220, and a smart watch 230, but this is merely exemplary, and the external apparatus 200 may be implemented as various electronic apparatuses capable of transceiving signals with the electronic apparatus 100.

Figure 2:
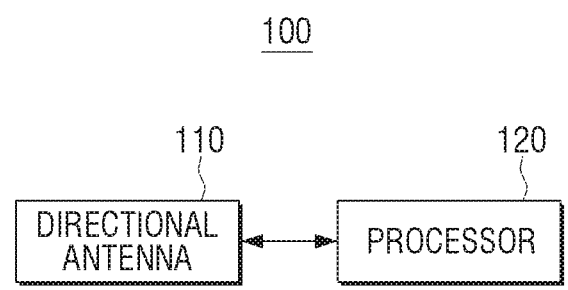
FIG. 2 is a block diagram illustrating an electronic apparatus according to an embodiment of the disclosure.

FIG. 2 is a block diagram illustrating an electronic apparatus according to an embodiment of the disclosure.

Referring to FIG. 2, the electronic apparatus 100 may include a directional antenna 110 and a processor 120.

The directional antenna 110 can transmit and receive signals in a specific direction. For example, the directional antenna 110 can transmit signals in a specific direction and receive signals in a specific direction, as opposed to randomly transmitting and receiving signals by the omnidirectional antenna.

To be specific, the directional antenna 110 may receive, from the external apparatus 200, a signal to request charging of the battery of the external apparatus 200. For example, the directional antenna 110 may receive a signal to request charging of a battery from the external apparatus 200 when a user command to request charging of the battery is input to the external apparatus 200 or remaining capacity of the battery of the external apparatus 200 is less than or equal to a preset capacity.

The directional antenna 110 may transmit an RF signal toward the external apparatus 200. Here, the RF signal is a signal for charging the battery of the external apparatus 200, and the RF signal can be generated by supplying power to the resonance coil provided in the electronic apparatus 100.

The directional antenna 110 can be implemented as an array antenna and so on.

The processor 120 controls overall operations of the electronic apparatus. For this, the processor 120 may include at least one of a central processing unit (CPU), an application processor (AP), or a communication processor (CP).

The processor 120 may receive from the external apparatus 200 a signal to request charging of the battery of the external apparatus 200.

To be specific, the processor 120 may receive from the external apparatus 200 a signal to request charging of the battery of the external apparatus 200 through the directional antenna 110.

The processor 120 may identify the location of the external apparatus 200 based on the intensity and direction of the signal received from the external apparatus 200. To be specific, the processor 120 can identify that the external apparatus 200 is relatively close to the electronic apparatus 100 as the intensity of the signal received from the external apparatus 200 is stronger, and identify that the external apparatus 200 is located in the direction of the signal received from the external apparatus 200.

It is only one embodiment to identify the position of the external apparatus 200 based on the strength and direction of a signal received from the external apparatus 200, and the processor 120 may determine the position of the external apparatus 200 in various ways.

In an embodiment of the disclosure, the processor 120 may identify the location of the external apparatus 200 through communication with the beacon. Here, the beacon means a device that transmits position information of the external apparatus 200 through a near field wireless communication, such as Bluetooth.

The processor 120 may also receive information about the location of the external apparatus 200 from the external apparatus 200. Specifically, the processor 120 may receive information about the location of the external apparatus 200 via a near field wireless communication network, such as Wi-Fi, Bluetooth, and the like. To this end, the electronic apparatus 100 may further include a wireless communication chip, such as a Wi-Fi chip or a Bluetooth chip.

The processor 120 may transmit the RF signal for charging the battery of the external apparatus 200 toward the external apparatus 200 based on the position of the external apparatus 200.

Specifically, when the position of the external apparatus 200 is identified based on the intensity and direction of a signal received from the external apparatus 200, the processor 120 may control the directional antenna 110 to transmit the RF signal to charge the battery of the external apparatus 200 toward the external apparatus 200. For example, rather than transmitting the RF signal in an omnidirectional manner, the processor 120 may transmit the RF signal toward the external apparatus 200.

Accordingly, compared to a case of transmitting the RF signal in an omnidirectional manner, battery of the external apparatus 200 can be charged rapidly and efficiently.

The RF signal can be generated by supplying power to the resonance coil provided in the electronic apparatus 100. Specifically, processor 120 may generate power by providing power to a resonant coil provided in electronic apparatus 100 to generate a specific frequency.

Compared to a wireless communication device that performs wireless charging using an electromagnetic induction method of the related art or a magnetic resonance method by charging the battery of the external apparatus 200 through an RF signal as described above, the electronic apparatus 100 may charge the battery of the external apparatus 200 remotely located.

In addition, a user may comparatively move and use the external apparatus 200 while charging.

When information that charging of the battery is completed is obtained from the external apparatus 200, the processor 120 may stop transmission of the RF signal.

Specifically, when the processor 120 receives from the external apparatus 200 information indicating that charging of the battery is completed, power is not provided to the resonance coil in the electronic apparatus 100 anymore, and generation of the RF signal can be stopped. Thus, unnecessary power consumption can be prevented.

In some cases, the processor 120 may receive from, a plurality of external apparatus 200, a signal to request charging of the battery included in each external apparatus 200.

For example, the processor 120 may receive a signal to request charging of the battery of a first external apparatus 210 from the first external apparatus 210 and receive a signal to request charging of a second external apparatus 200 from a second external apparatus 220.

In this case, the processor 120 may sequentially transmit the RF signal to charge the battery to the first external apparatus 210 and the second external apparatus 200.

Specifically, the processor 120 may sequentially transmit an RF signal to charge the battery to the first external apparatus 210 and the second external apparatus 220 according to a priority.

The priority can be set by a user input for each external apparatus 200. For example, when a user input is entered to preferentially charge the first external apparatus 210 to the second external apparatus 220 by a user terminal device that communicates with the electronic apparatus 100, the processor 120 may transmit the RF signal to the first external apparatus 210 in preference to the second external apparatus 220.

When a signal to inform that charging of the battery is completed is received from the first external apparatus 210, the processor 120 may stop transmitting the RF signal to the first external apparatus 210 and transmit the RF signal to the second external apparatus 220.

By sequentially transmitting the RF signal to the plurality of external apparatus 200 according to a priority, a user may preferentially charge the external apparatus 200 which needs to be charged first.

The priority can be determined by various methods, in addition to a user input. For example, out of the first external apparatus 210 and the second external apparatus 220, the processor 120 may identify an apparatus having high frequency of use, that is, an apparatus a user frequently uses, and transmit the RF signal first to a frequently used apparatus.

The frequency of use can be determined based on the past charging history information. Specifically, the processor 120 can identify an apparatus that has been frequently charged based on the charging history information, and can transmit an RF signal first to an apparatus that has been frequently charged. To this end, the electronic apparatus 100 may further include a storage to store charging history information for each of the external apparatus 200.

In addition, the processor 120 can identify an apparatus having a fast charging speed among the first external apparatus 210 and the second external apparatus 220, and can transmit an RF signal to an apparatus having a fast charging speed first. The charging speed can be distinguished based on the charging history information stored in the storage. Specifically, the processor 120 can identify the external apparatus 200 having a fast charging speed based on the charging speed of the external apparatus 200, which is included in the charging history information.

The processor 120 may transmit the RF signal to charge the battery respectively to the first external apparatus 210 and the second external apparatus 220. For example, the processor 120 may charge battery of the first external apparatus 210 and the battery of the second external apparatus 220 at the same time.

Hereinafter, the description will be given with reference to FIG. 3.

Figure 3:
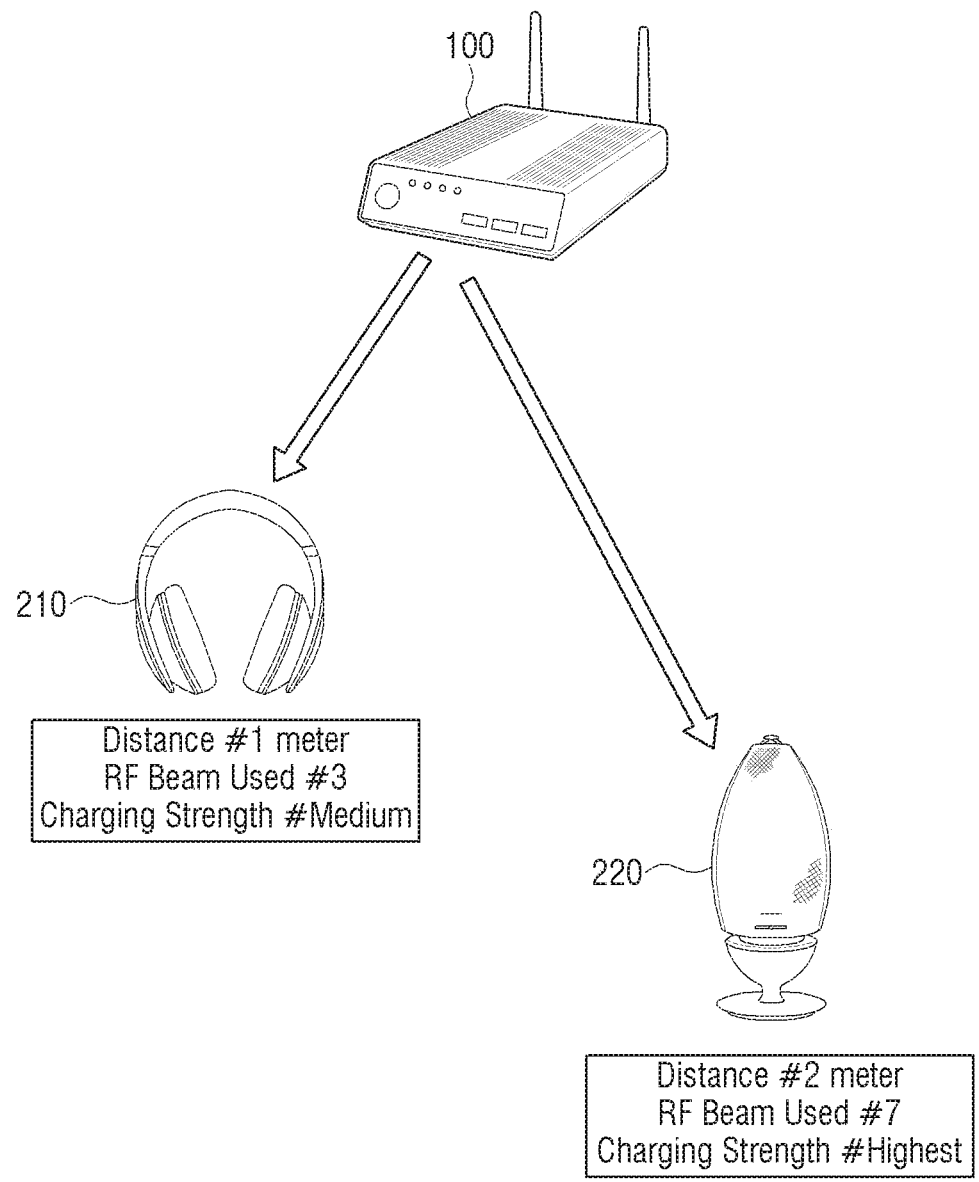
FIG. 3 is a diagram illustrating an operation of an electronic apparatus which receives a signal to request charging of a battery from a plurality of external apparatuses according to an embodiment of the disclosure.

FIG. 3 is a diagram illustrating an operation of an electronic apparatus which receives a signal to request charging of a battery from a plurality of external apparatuses according to an embodiment of the disclosure.

Referring to FIG. 3, the processor 120 may receive a signal, from the plurality of external apparatus 200, to request charging of the battery included in each external apparatus 200.

For example, the processor 120 may receive, from the first external apparatus 210, a signal to request charging of the battery of the first external apparatus 210, and receive, from the second external apparatus 220, a signal to request charging of the battery of the second external apparatus 200.

In this case, the processor 120 may identify intensity of the RF signals which are to be transmitted to each of the first external apparatus 210 and the second external apparatus 200 according to a priority of the first external apparatus 210 and the second external apparatus 220.

As described above, the priority can be set by a user input for each external apparatus 200, or can be determined by a frequency of use of the external apparatus 200 or charging speed of the external apparatus or the like.

When the priority of the first external apparatus 210 and the second external apparatus 220 is identified, the processor 120 may divide intensity of the RF signal according to priority and transmit the divided RF signal to each of the first external apparatus 210 and the second external apparatus 220.

For example, when the charging intensities of the first external apparatus 210 and the second external apparatus 220 are set to 3:7 according to a user input, the processor 120 may set the intensity of the RF signal to 3:7, transmit the RF signal having the intensity of 30% to the first external apparatus 210, and transmit the RF signal having the intensity of 70% to the second external apparatus 220.

As another example, if the frequency of use of the external apparatus 200 is found to be 3:7, the processor 120 may divide the RF signal strength into 3:7, transmit the RF signal having the intensity of 30% to the first external apparatus 210, and transmit the RF signal having the intensity of 70% to the second external apparatus 220.

As described above, rather than simply charging the external apparatus 210 at a short distance from the electronic apparatus 100 with a strong charging intensity and charging the external apparatus 220 at a relatively long distance with a weak charging intensity, by dividing the intensity of the RF signal according to the priorities and charging the batteries of a plurality of the external apparatus 200, the user can charge the external apparatus 200 which is required to be charged first.

Unlike a case where a related-art wireless charging apparatus can charge one external apparatus, the electronic apparatus 100 has the effect of charging a plurality of the external apparatus 200 at the same time. By transmitting an RF signal toward the external apparatus 200 instead of transmitting an RF signal omnidirectionally, charging efficiency can be improved as well.

The above-described embodiment is only one embodiment of the disclosure, and the processor 120 may charge each battery of a plurality of the external apparatus 200 based on the distance between the electronic apparatus 100 and the external apparatus 200. For example, the processor 120 may charge the external apparatus 210, which is at a short distance from the electronic apparatus 100, with a strong charging intensity, and charge the external apparatus 220, which is at a relatively long distance, with a weak charging intensity.

Figure 4A:
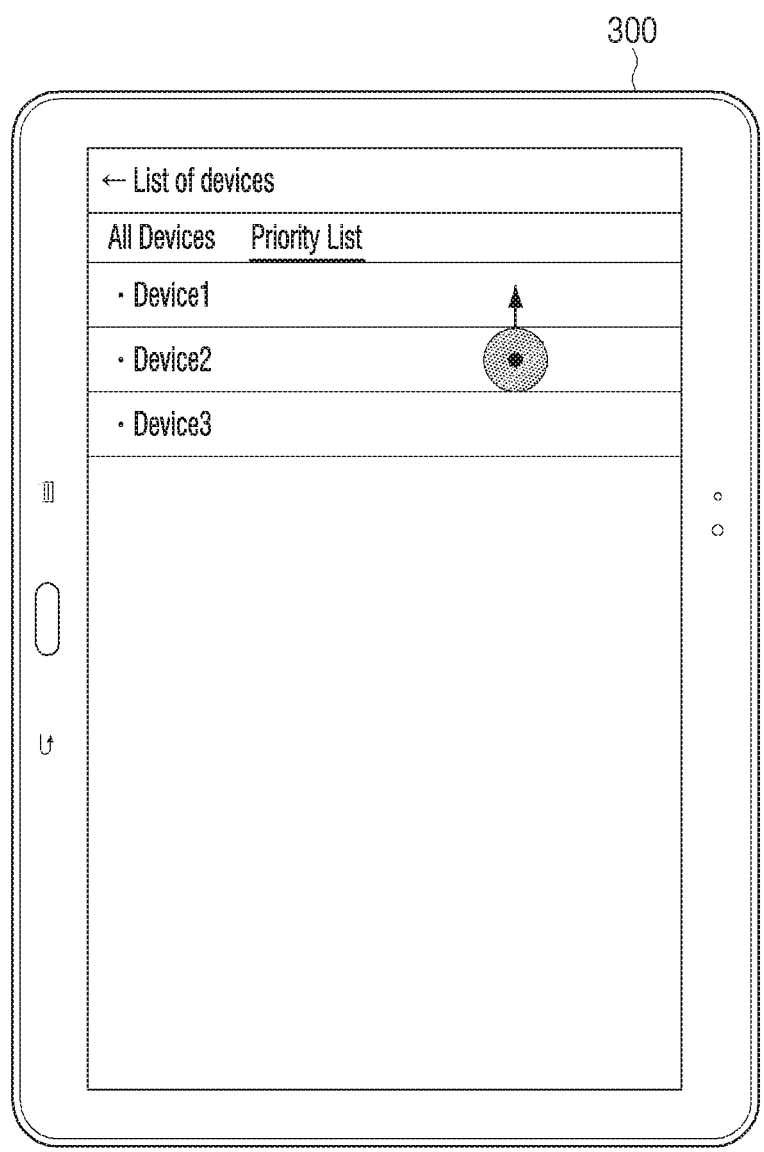
FIG. 4A is a diagram illustrating a method for setting a priority according to an embodiment of the disclosure.
Figure 4B:
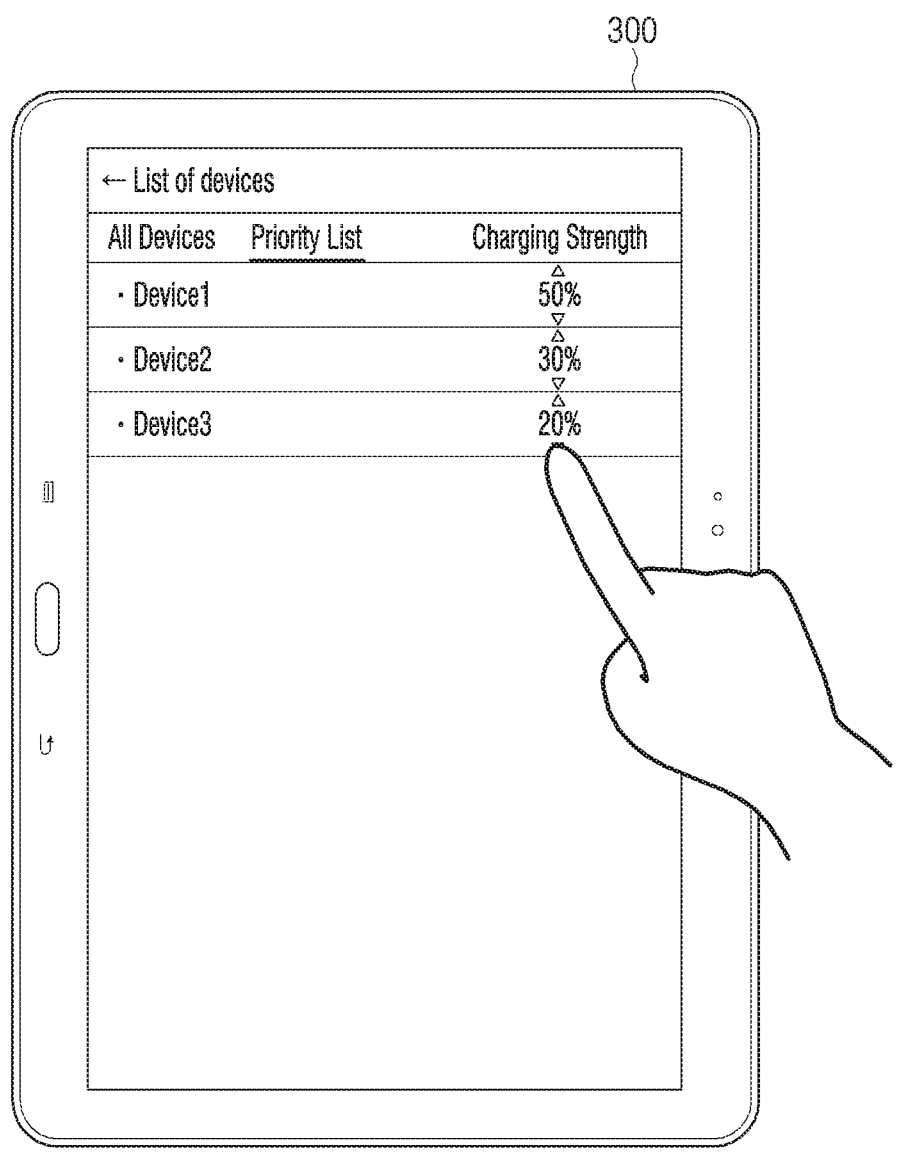
FIG. 4B is a diagram illustrating a method for setting a priority according to an embodiment of the disclosure.

FIGS. 4A and 4B are diagrams illustrating a method for setting a priority according to various embodiments of the disclosure.

Referring to FIGS. 4A and 4B, the electronic apparatus 100 may transceiver various data by communicating with a user terminal apparatus 300. To this end, the electronic apparatus 100 may further include a wireless communication chip, such as a Wi-Fi chip and a Bluetooth chip.

The electronic apparatus 100 may transmit, to the user terminal apparatus 300, information on the external apparatus 200 which is to be charged. The information on the external apparatus 200 may include information on identification of the external apparatus 200 and remaining capacity of the battery of the external apparatus 200, or the like. The electronic apparatus 100 may receive, from the external apparatus 200, information on the external apparatus 200.

The user terminal apparatus 300 may display a screen for setting a priority of charging by external apparatus 200.

For example, referring to FIG. 4A, a user terminal apparatus 300 may display a list of a plurality of the external apparatus 200. When a specific external apparatus 200 is selected by user input, the selected external apparatus 200 can be set to a charging subject having a priority higher than an external apparatus which is not selected.

For example, as illustrated in FIG. 4A, when the specific external apparatus is touched and then dragged over a different external apparatus, the dragged external apparatus 200 may be set to a subject to be preferentially charged than an external apparatus at a lower side in the list.

The user terminal apparatus 300 may transmit, to the electronic apparatus 100, information on the set priority.

The processor 120 may identify the external apparatus 200 set in priority order based on the information received from the user terminal apparatus 300. The processor 120 may sequentially transmit, to the plurality of external apparatus 200, the RF signal according to the set priorities.

Referring to FIG. 4B, the user terminal apparatus 300 may display a screen for setting charging intensities by the plurality of external apparatus 200. The user terminal apparatus 300 may set a charging intensity according to a user command that is input to set charging intensity.

For example, referring to FIG. 4B, the user terminal apparatus 300 may set charging intensity of the first external apparatus to 50%, charging intensity of the second external apparatus to 30%, and charging intensity of a third external apparatus to 20% according to an input user command.

The user terminal apparatus may transmit, to the electronic apparatus 100, information on the set charging intensity.

The processor 120 may identify the charging intensities that are set for the plurality of external apparatus 200 based on the information received from the user terminal apparatus 300. The processor 120 can identify the external apparatus 200 having a high charging intensity as the higher priority apparatus 200, and can transmit a strong RF signal. In this embodiment of the disclosure, the processor 120 may transmit an RF signal having 50% intensity to the first external apparatus, an RF signal having 30% intensity to the second external apparatus, and an RF signal having 20% intensity to the third external apparatus.

Figure 5:
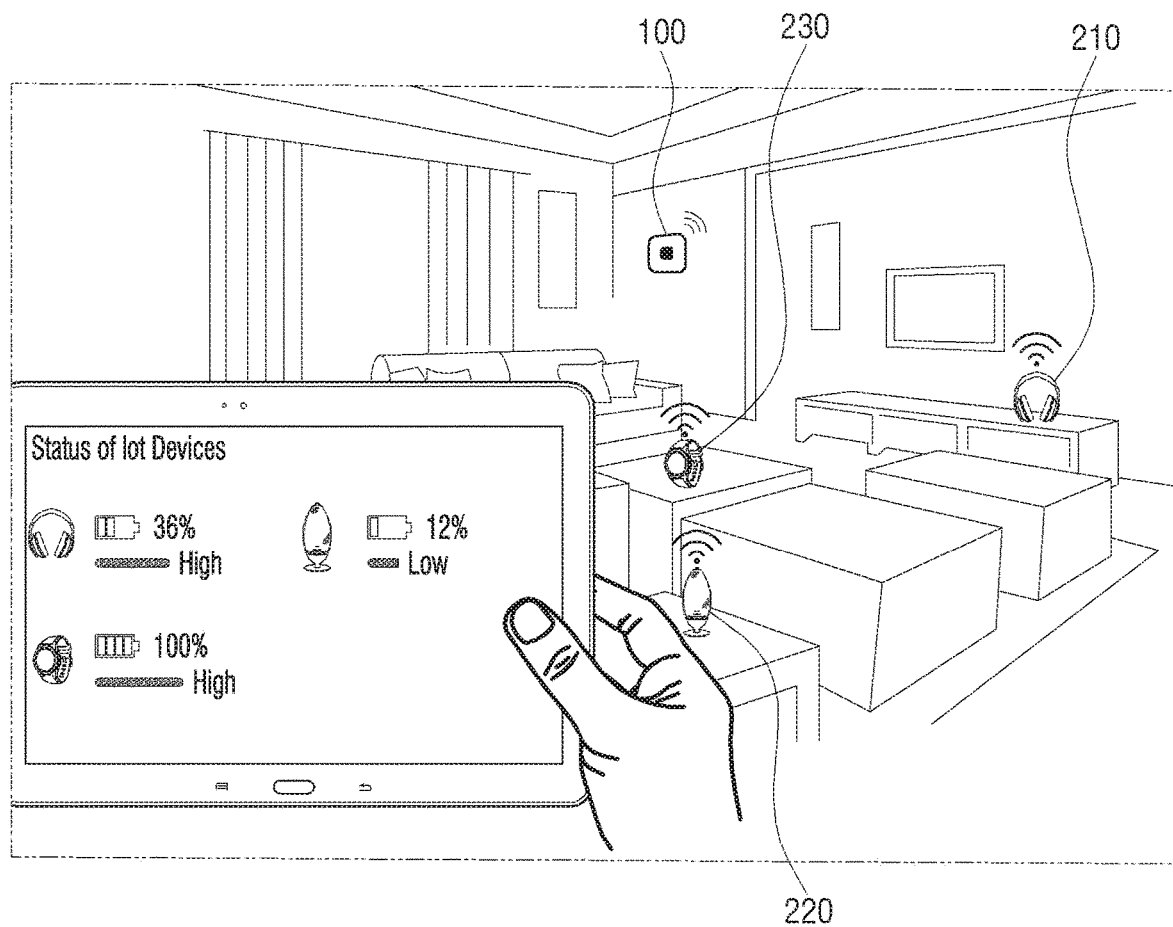
FIG. 5 is a diagram illustrating a user interface (UI) according to an embodiment of the disclosure.

FIG. 5 is a diagram illustrating a user interface (UI) according to an embodiment of the disclosure.

Referring to FIG. 5, the electronic apparatus 100 may transmit, to the user terminal apparatus 300, information on an external apparatus. The information on the external apparatus 200 may include information on identification of the external apparatus 200, remaining capacity of the battery of the external apparatus 200, and a charging intensity of the external apparatus 200, or the like.

To this end, the processor 120 may receive, from the external apparatus 200, identification information for the external apparatus 200, information about the remaining capacity of the battery of the external apparatus 200, or the like. Specifically, the processor 120 may communicate with the external apparatus 200 and receive information on the identification of the external apparatus 200, the remaining capacity of the battery of the external apparatus 200, or the like.

The information on the charging intensity may be information corresponding to the intensity of the RF signal which is being transmitted.

As shown in FIG. 5, the user terminal apparatus 300 may display a UI including information on the remaining capacity and the charging intensity of the battery for each external apparatus 300 on the display. Accordingly, the user can recognize information on the remaining capacity and the charging intensity of the battery by the external apparatus 200 through the UI displayed on the user terminal apparatus 300.

Figure 6:
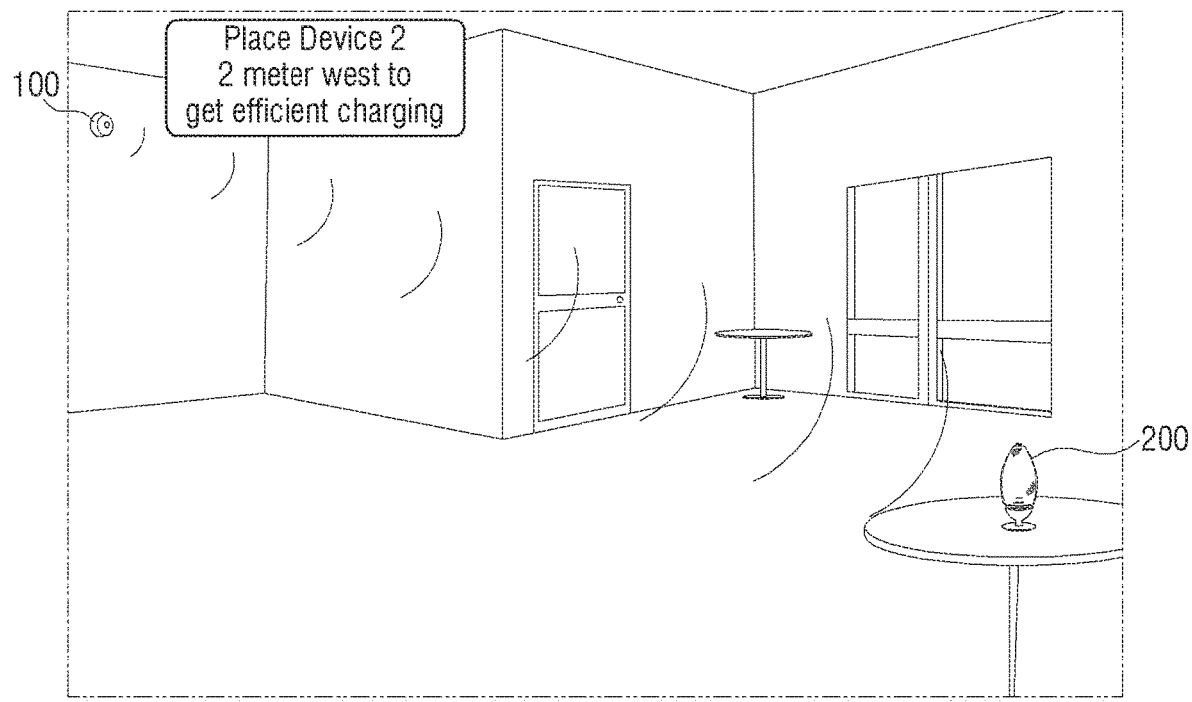
FIG. 6 is a diagram illustrating guide information according to an embodiment of the disclosure.

FIG. 6 is a diagram illustrating guide information according to an embodiment of the disclosure.

Referring to FIG. 6, the processor 120 may identify the location of the external apparatus 200 based on the intensity and direction of the signal received from the external apparatus 200. Specifically, the processor 120 can identify that the external apparatus 200 is relatively adjacent to the electronic apparatus 100 as the intensity of the signal received from the external apparatus 200 is stronger, and can identify that the external apparatus 200 is located in the direction of the signal received from the external apparatus 200.

When it is confirmed that the external apparatus 200 is located at a position which is farther than a preset distance from the electronic apparatus 100, the processor 120 may provide guide information to let the external apparatus 200 move to a position which is closer than the preset distance.

When the external apparatus 200 is positioned at a location farther than a preset distance from the electronic apparatus 100, the external apparatus 200 is moved to a closer position to get efficient charging.

For example, according to FIG. 6, when it is confirmed that the external apparatus 200 is positioned at a location which is farther than a preset distance from the electronic apparatus 100, the processor 120 may output a sound to let the external apparatus 200 move to a position closer than a preset distance. To this end, the electronic apparatus 100 may further include a speaker.

Outputting a sound by a speaker is merely exemplary, and the processor 120 may display a message to let the external apparatus 200 move, through communication with the user terminal apparatus 300.

Figure 7:
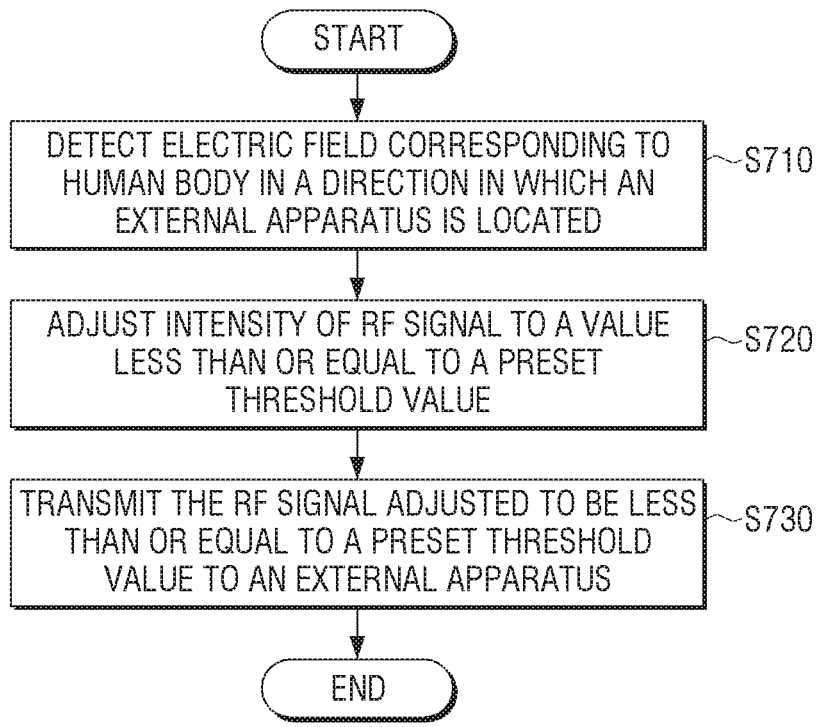
FIG. 7 is a diagram illustrating adjusting of intensity of an RF signal by an electronic apparatus according to an embodiment of the disclosure.

FIG. 7 is a diagram illustrating adjusting of intensity of an RF signal by an electronic apparatus according to an embodiment of the disclosure.

Referring to FIG. 7, in charging a battery of the external apparatus 200 through a wireless signal, if the user is located near the external apparatus 200, the user's human body may have a harmful influence. To address this issue, the processor 120 may adjust the intensity of the RF signal below a predetermined threshold value when the user is sensed between the electronic apparatus 100 and the external apparatus 200.

The processor 120 may detect electric field corresponding to the human body in a direction where the external apparatus 200 is positioned in operation S710. To do this, the electronic apparatus 100 may further include a sensor that can detect the electric field.

For example, when frequency impedance which is less than 110 is detected in a direction where the external apparatus 200 is positioned, it may be identified that a user is present between the electronic apparatus 100 and the external apparatus 200.

When the electric field corresponding to the human body is detected through the sensor in the direction in which the external apparatus 200 is positioned, the processor 120 may adjust the intensity of the RF signal to a predetermined threshold or less in operation S720. Here, the predetermined threshold value may be an RF signal intensity that is in a degree not to have a harmful influence on the human body. For example, a predetermined threshold value may be a value that about 97 mWatt can be provided in a 1 cm×1 cm space.

The processor 120 may transmit, to the external apparatus 200, the RF signal that is adjusted to a value that is less than or equal to a preset threshold value in operation S730.

Accordingly, the electronic apparatus 100 may prevent a wireless signal from having a harmful influence on the human body.

The case where the user is detected through the electric field has been described as an example, but the method of detecting the user is not limited thereto. For example, the electronic apparatus 100 can adjust the intensity of the RF signal to a predetermined threshold value or less when infrared rays generated in the human body are detected near the external apparatus 200 through an infrared sensor.

Figure 8:
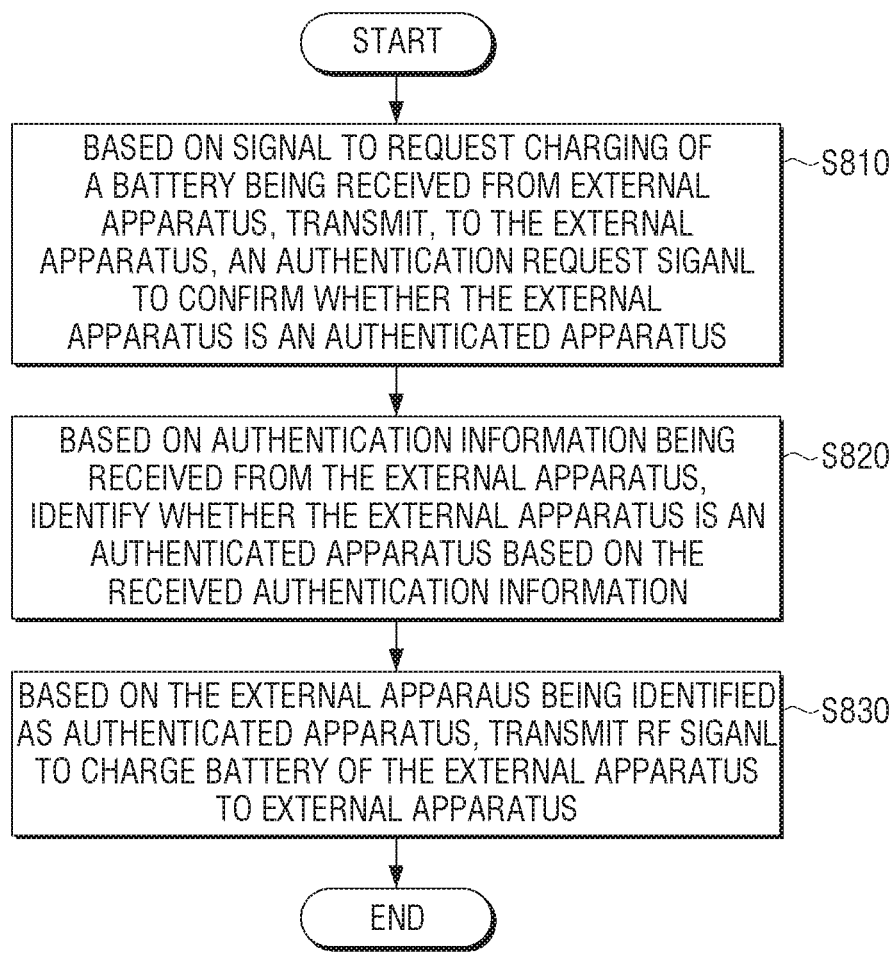
FIG. 8 is a diagram illustrating an authentication procedure according to an embodiment of the disclosure.

FIG. 8 is a diagram illustrating an authentication procedure according to an embodiment of the disclosure.

Referring to FIG. 8, when a signal to request charging of the battery is received from the external apparatus 200, the processor 120 may transmit, to the external apparatus 200, a signal to request authentication to confirm whether the external apparatus 200 is an authenticated apparatus in operation S810.

Specifically, when a signal to request charging the battery is received from the external apparatus 200, the processor 120 may generate a one-time password (OTP). The processor 120 may transmit, to the external apparatus 200, a signal to request authentication to ask input of a password that is the same as the generated password.

When the authentication information is received from the external apparatus 200, the processor 120 may identify whether the external apparatus 200 is an authenticated apparatus based on the received authentication information in operation S820. Specifically, when the received authentication information, i.e., the received password matches the generated OTP, the processor 120 may identify the external apparatus 200 as an authenticated apparatus.

When the external apparatus 200 is identified as an authenticated apparatus, the processor 120 may transmit, to the external apparatus 200, an RF signal to charge the battery of the external apparatus 200 in operation S830.

Identifying whether the external apparatus 200 is an authenticated apparatus using the OTP is merely exemplary, and authentication can be performed by various methods.

As described above, by transmitting an RF signal to the external apparatus 200 that is identified through an authentication procedure and not transmitting an RF signal to an external apparatus that is not authenticated, unnecessary power consumption can be prevented.

Figure 9:
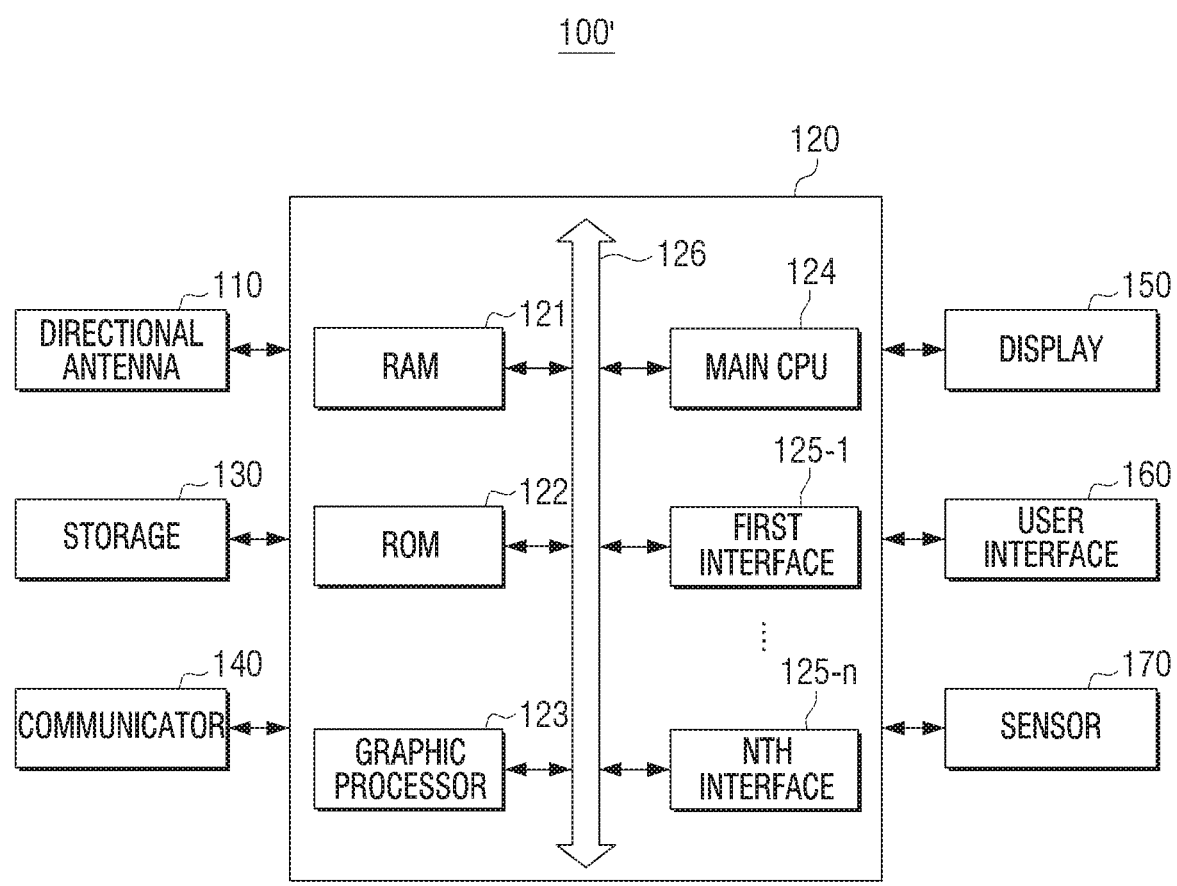
FIG. 9 is a block diagram of an electronic apparatus according to an embodiment of the disclosure.

FIG. 9 is a block diagram of an electronic apparatus according to an embodiment of the disclosure.

Referring to FIG. 9, an electronic apparatus 100' according to an embodiment of the disclosure may include the directional antenna 110, the processor 120, a storage 130, a communicator 140, a display 150, a user interface 160, and a sensor 170. The processor 120 may include a random access memory (RAM) 121, a read only memory (ROM) 122, a graphic processor 123, a main CPU 124, a first interface 125-1 through an nth interface 125-n.

Hereinafter, a part that is overlapped with the aforementioned description will not be further described.

The storage 130 may store an operating system (OS) to control overall operations of components of the electronic apparatus 100' and instructions or data relating to the components of the electronic apparatus 100'.

Accordingly, the processor 120 may control a plurality of hardware or software components of the electronic apparatus 100' using various instructions or data stored in the storage 130, load and process instructions or data received from at least one of different components to a transitory memory, and store various data in a non-transitory memory.

In particular, the storage 130 may store charging history information of the external apparatus 200. The charging history information may include information on charging frequency of the external apparatus 200 and charging speed of the external apparatus 200 or the like.

The communicator 140 may communicate with various apparatuses through various communication networks.

Specifically, the communicator may communicate with the external apparatus 200 and receive, from the external apparatus 200, information on the identification of the external apparatus 200 and the remaining capacity of the battery of the external apparatus 200, or the like.

The communicator 140 may communicate with the user terminal apparatus 300 and transmit, to the user terminal apparatus 300, information including identification information of the external apparatus 200 and remaining capacity of the battery of the external apparatus 200, or the like.

The communicator 140 may receive, from the user terminal apparatus 300, information on charging priority of the external apparatus 200.

To do this, the communicator 140 may include a wireless communication chip, such as a Wi-Fi chip and a Bluetooth chip, or the like.

The display 150 may display various screens. Here, the display 150 may be implemented as various types of displays, such as a liquid crystal display panel (LCD), a light emitting diode (LED), an organic light emitting diode (OLED), a liquid crystal on silicon (LCoS), digital light processing (DLP), or the like. In addition, a driving circuit, a backlight unit, and the like that can be implemented in the form of an a-si thin film transistor (TFT), a low temperature poly silicon (LTPS) TFT, an organic TFT (OTFT).

Specifically, the display 150 may display information about the external apparatus 200 being charged. Herein, the information on the external apparatus 200 may include information, such as a name of the external apparatus 200, the remaining capacity of the battery of the external apparatus 200, intensity of charging, and so on.

The display 150 may arrange and display a plurality of the external apparatus 200 based on charging priority.

Here, priority can be set by a user command or the like which is input to the user terminal apparatus 300 as described above.

However, this is an embodiment only, and the priority may also be set by a user command inputted through the user interface 160 of an electronic apparatus 100'. Here, the user interface 160 may be a physical key provided in the electronic apparatus 100'. Alternatively, if the display 150 is implemented as a touchpad capable of receiving a user's touch input, the user interface 150 may be a touchpad.

The sensor 170 may detect electric field around the electronic apparatus 100'. To be specific, the sensor 170 may detect electric field of a direction where the external apparatus 200 is located.

Figure 10:
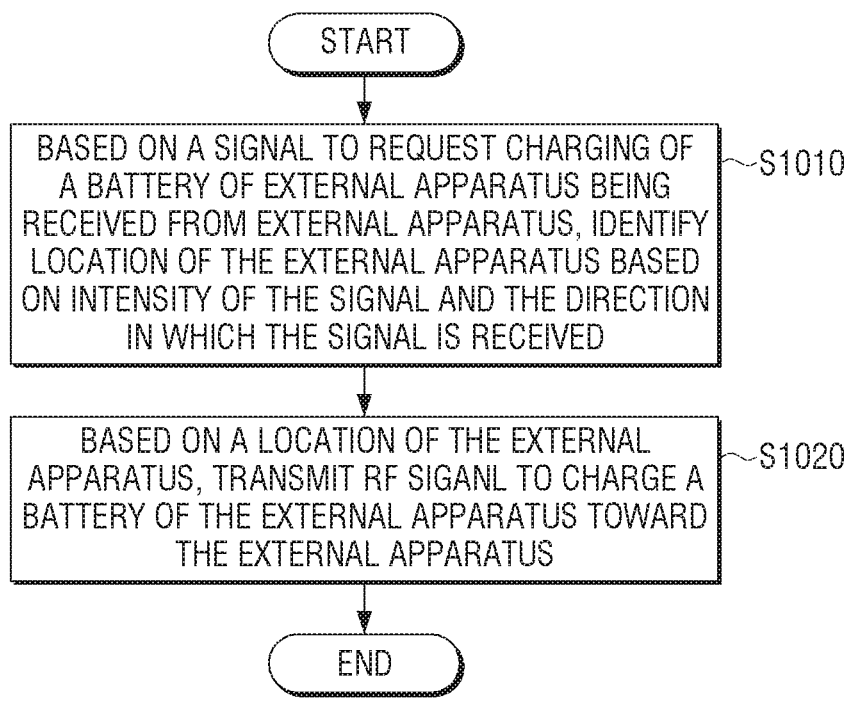
FIG. 10 is a flowchart illustrating an operation of an electronic apparatus according to an embodiment of the disclosure.

FIG. 10 is a flowchart illustrating an operation of an electronic apparatus according to an embodiment of the disclosure.

Referring to FIG. 10, the electronic apparatus 100 according to an embodiment of the disclosure may be configured that when a signal to request charging of battery of the external apparatus 200 is received from the external apparatus 200, the position of the external apparatus 200 can be identified based on the intensity and receiving direction of the signal in operation S1010.

Specifically, the electronic apparatus 100 can identify the external apparatus 200 as being relatively close to the electronic apparatus 100 as the intensity of the signal received from the external apparatus 200 is stronger, and can identify that the external apparatus 200 is located in the direction of the signal received from the apparatus 200.

The electronic apparatus 100 may then transmit a RF signal to the external apparatus 200 to charge the battery of the external apparatus 200 based on the location of the external apparatus 200 in operation S1020.

For example, other than transmitting an RF signal omnidirectionally, the electronic apparatus 100 may transmit an RF signal toward the external apparatus 200.

Compared to transmitting an RF signal omnidirectionally, the disclosure can charge battery of the external apparatus 200 rapidly and efficiently.

The electronic apparatus 100 may transmit an RF signal to each of a plurality of the external apparatus 200 when a signal to request charging of the battery is received from a plurality of the external apparatus 200.

When battery of the plurality of external apparatus 200 is charged, battery of each external apparatus 200 can be charged efficiently without waste of energy.

Methods according to various embodiments can be implemented as software or application which can be installed in an existing electronic apparatus.

Methods according to various embodiments can be implemented only by software upgrade or hardware upgrade of an existing electronic apparatus.

It is also possible that various embodiments of the disclosure are performed using an embedded server of an electronic apparatus or a server outside an electronic apparatus.

A computer program product comprising one or more computer readable storage media having program which sequentially performs a controlling method of the electronic apparatus according to the embodiment can be provided.

A non-transitory computer readable medium that stores a program which sequentially performs a controlling method of the electronic apparatus according to the embodiment can be provided.

Non-transitory computer readable medium means a medium that stores data for a short period of time, such as a register, a cache, a memory, etc., but semi-permanently stores data and can be read by a device. Specific examples of non-transitory computer readable media include compact disc (CD), digital versatile disc (DVD), hard disk, Blu-ray disk, universal serial bus (USB), memory card, ROM, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
    a directional antenna; and
    at least one processor configured to:
        based on a first signal to request charging of a battery of a first external apparatus being received from the first external apparatus through the directional antenna, identify, based on intensity of the first signal and a direction in which the first signal is received, a location of the first external apparatus,
        based on a second signal to request charging of a battery of a second external apparatus being received from the second external apparatus through the directional antenna, identify, based on intensity of the second signal and a direction in which the second signal is received, a location of the second external apparatus,
        identify intensities of a radio frequency (RF) signal to be transmitted to each of the first external apparatus and the second external apparatus according to a charging priority, and
        control the direction antenna to transmit substantially concurrently the RF signal to charge together the battery of the first external apparatus and the battery of the second external apparatus based on the identified intensities of the RF signal to the first external apparatus and the second external apparatus.

2. The electronic apparatus of claim 1, wherein the at least one processor is further configured to, based on signals to request charging of batteries of the first external apparatus and the second external apparatus being received from the first external apparatus and the second external apparatus respectively, transmit the RF signal to charge the battery of the first external apparatus to the first external apparatus and the RF signal to charge the battery of the second external apparatus to the second external apparatus sequentially according to the charging priority.

3. The electronic apparatus of claim 1, wherein the at least one processor is further configured to, based on the first external apparatus being identified to be positioned at a location that is farther than a preset distance from the electronic apparatus based on a location of the first external apparatus, provide guide information to request a user to move the first external apparatus to a location that is closer than the preset distance.

4. The electronic apparatus of claim 1, further comprising:
    a sensor,
    wherein the at least one processor is further configured to, based on an electric field corresponding to a human body being detected by the sensor in a direction where the first external apparatus is located, adjust intensity of the RF signal that is transmitted to the first external apparatus to be less than or equal to a preset threshold value.

5. The electronic apparatus of claim 1, wherein the at least one processor is further configured to transmit, to a user terminal apparatus, information on charging intensity of the first external apparatus corresponding to the intensity of the RF signal and information on remaining capacity of the battery received from the first external apparatus.

6. The electronic apparatus of claim 1, wherein the at least one processor is further configured to, based on information to inform that charging of the battery is completed being received from the first external apparatus, stop transmitting the RF signal.

7. The electronic apparatus of claim 1, wherein the at least one processor is further configured to:
    based on a signal to request charging of the battery being received from the first external apparatus, transmit, to the first external apparatus, an authentication request signal to confirm whether the first external apparatus is an authenticated apparatus based on a location of the first external apparatus, and
    based on authentication information being received from the first external apparatus, to respond to transmission of the authentication request signal,
        identify whether the first external apparatus is an authenticated apparatus based on the authentication information, and
        when the first external apparatus is an authenticated apparatus, transmit the RF signal to the first external apparatus.

8. A method for controlling an electronic apparatus, the method comprising:
    based on a first signal to request charging of a battery of a first external apparatus being received from the first external apparatus, identifying, based on intensity of the first signal and a direction in which the first signal is received, a location of the first external apparatus;

based on a second signal to request charging of a battery of a second external apparatus being received from the second external apparatus, identifying, based on intensity of the second signal and a direction in which the second signal is received, a location of the second external apparatus;

identifying intensities of a radio frequency (RF) signal to be transmitted to each of the first external apparatus and the second external apparatus according to a charging priority; and transmitting substantially concurrently the RF signal to charge together the battery of the first external apparatus and the battery of the second external apparatus based on the identified intensities of the RF signal to the first external apparatus and the second external apparatus.

9. The method of claim 8, wherein the transmitting of the RF signal comprises:
based on signals to request charging of batteries of the first external apparatus and the second external apparatus being received from the first external apparatus and the second external apparatus respectively, transmitting the RF signal to charge the battery of the first external apparatus to the first external apparatus and the RF signal to charge the battery of the second external apparatus to the second external apparatus sequentially according to the charging priority.

10. The method of claim 8, further comprising:
based on the first external apparatus being identified to be positioned at a location that is farther than a preset distance from the electronic apparatus based on a location of the first external apparatus, providing guide information to request a user to move the first external apparatus to a location that is closer than the preset distance.

11. The method of claim 8, wherein the transmitting of the RF signal comprises:
detecting an electric field corresponding to a human body in a direction in which the first external apparatus is located; and
adjusting intensity of the RF signal that is transmitted to the first external apparatus to be less than or equal to a preset threshold value.

12. The method of claim 8, further comprising:
transmitting, to a user terminal apparatus, information on charging intensity of the first external apparatus corresponding to the intensity of the RF signal and information on remaining capacity of the battery received from the first external apparatus.

13. The method of claim 8, further comprising:
based on information to inform that charging of the battery is completed being received from the first external apparatus, stopping the transmitting of the RF signal.

14. The method of claim 8, wherein the transmitting of the RF signal comprises:
based on a signal to request charging of the battery being received from the first external apparatus, transmitting, to the first external apparatus, an authentication request signal to confirm whether the first external apparatus is an authenticated apparatus based on a location of the first external apparatus;

based on authentication information being received from the first external apparatus, to respond to transmission of the authentication request signal, identifying whether the first external apparatus is an authenticated apparatus; and based on the first external apparatus being an authenticated apparatus, transmitting the RF signal to the first external apparatus.

15. A computer program product comprising one or more non-transitory computer readable storage media having a program therein comprising:
based on a first signal to request charging of a battery of a first external apparatus being received by an electronic apparatus from the first external apparatus, identifying, based on intensity of the first signal and a direction in which the first signal is received, a location of the first external apparatus;

based on a second signal to request charging of a battery of a second external apparatus being received from the second external apparatus, identifying, based on intensity of the second signal and a direction in which the second signal is received, a location of the second external apparatus;

identifying intensities of a radio frequency (RF) signal to be transmitted to each of the first external apparatus and the second external apparatus according to a charging priority; and transmitting substantially concurrently the RF signal to charge together the battery of the first external apparatus and the battery of the second external apparatus based on the identified intensities of the RF signal to the first external apparatus and the second external apparatus.

16. The computer readable storage media of claim 15, wherein the transmitting of the RF signal comprises:
based on signals to request charging of batteries of the first external apparatus and the second external apparatus being received from the first external apparatus and the second external apparatus respectively, transmitting the RF signal to charge the battery of the first external apparatus to the first external apparatus and the RF signal to charge the battery of the second external apparatus to the second external apparatus sequentially according to the charging priority.

17. The computer readable storage media of claim 15, further comprising:
based on the first external apparatus being identified to be positioned at a location that is farther than a preset distance from the electronic apparatus based on a location of the first external apparatus, providing guide information to request a user to move the first external apparatus to a location that is closer than the preset distance.

* * * * *